N. C. DAY.
Axle-Box.
No. 1,680. Patented July 10, 1840.
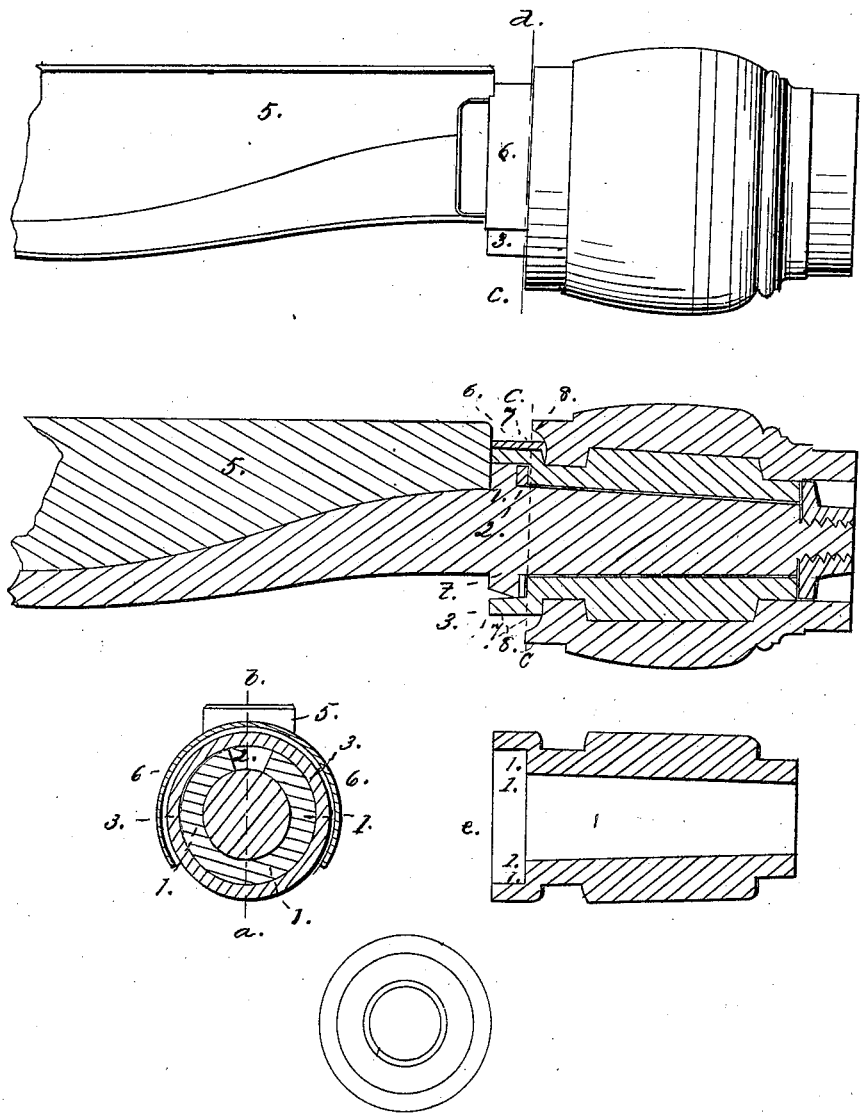

UNITED STATES PATENT OFFICE.

NATHL. C. DAY, OF LUNENBURG, MASSACHUSETTS.

METHOD OF GREASING AND KEEPING DUST, &c., OUT OF THE BOXES OF CARRIAGE-WHEEL HUBS.

Specification of Letters Patent No. 1,680, dated July 10, 1840.

*To all whom it may concern:*

Be it known that I, NATHANIEL C. DAY, of Lunenburg, in the county of Worcester and State of Massachusetts, have invented a new, improved and useful method of preventing the friction occasioned in the boxes and axles of the wheels of wheeled vehicles, by the dust and gravel falling from the wheels upon the axle-tree between the end of the box and the washer, by constructing a hub, box and washer in the form herein described, and also a reservoir for grease as herein described, which I call an "Improved Axle-tree."

My axle-tree is formed and turned in the usual manner, except that it is bent down in the central part between the two wheels, and except that the washer or shoulder (1) against which the larger end of the box (namely that toward the body of the vehicle) runs, does not extend so far from the center of the axle-tree, or, in other words, is of less diameter, measuring through the axle-tree, than those now in use. Directly over the axle-tree, on the upper part of the washer or shoulder just mentioned, from its upper part down to the axle-tree, I have a reservoir (2) for grease, being about one quarter of an inch deep from the face of the washer or shoulder toward the center of the body of the vehicle, and three quarters of an inch, or a little more or less, wide, measuring fore and aft of the vehicle. This reservoir being filled with grease, as the axle-tree heats by use, the grease is melted and flows down sufficiently to keep the axle-tree properly greased.

My box is cast in the common form, except that at the inner end toward the center of the vehicle (3) it projects over, and covers the washer or shoulder already described; that is, the exterior periphery of the box is extended out toward the body of the vehicle an inch, more or less, so as to inclose and cover the shoulder or washer already described to that extent, the interior surface of this flanch or projection (3) passing as near to the outside of the washer (1) at the top as may be without coming in contact with it. This flanch or projection of the box should be about one-eighth of an inch in thickness more or less, to give it a sufficient strength, the requisite thickness for which purpose will depend on its size or diameter. The exterior surface or periphery (4) of the washer or shoulder already described, and coming directly under or within, and being encompassed and inclosed by the flanch or projection already described, is made slightly conical in its form, contracting and tapering, and so its upper surface descending toward the body or central part of the vehicle so as to carry any gravel, sand or dust, that may fall upon it, away from the box, and thus prevent its getting between the box and the axle-tree.

I also attach to the stock or bedpiece (5) of the axle-tree, a semi-circular iron hoop (6), for a gravel guard or sand-loop, which shuts directly over and nearly or quite covers the flanch of the box already described (3), and comes as near to that flanch as may be without coming in contact with it. The object of this sand-loop as is obvious, is to catch the gravel, sand, mud, and dust that falls from the wheel, and if any of it falls over the edge of this hoop it falls upon the flanch or projection of the box (3) already described, by the revolution of which it is carried over and dropped off from the underside; or if any of it falls over the edge of the flanch upon the upper surface of the washer, its form (it being tapering and so on the upper side descending from the box) will carry the gravel or sand from the box as already described.

The inner end of the hub toward the center or body of the vehicle is scooped out, or made saucer-formed (7) or has a projecting flanch (8) by which it projects and juts over the sand-hoop, so that the gravel, sand or dust falling from it falls on the surface of the sand-hoop most distant from its edge, and nearest to the bedpiece (5) of the axle-tree, and so on the part where it is most likely to fall over forward or aft of the axle-tree instead of falling over the edge of the gravel hoop upon the box-flanch. The above figures refer to the annexed drawings.

I claim as my invention, and ask a patent for—

The axle-tree box of the wheel of wheeled vehicles constructed by the combination of the conical periphery of the washer, the grease reservoir, the flanch of the box, and the gravel guard as above described.

I do not claim either of these improvements separately, though the construction of the washer and the box-flanch are my improvements, but I consider their utility as depending on their combination as above.

In witness whereof I hereto set my hand, this thirteenth day of June, in the year of our Lord eighteen hundred and forty.

NATHANIEL C. DAY.

Witnesses:
 WILLARD PHILLIPS,
 RICHD. ROBINS.